(12) United States Patent
Rasheed

(10) Patent No.: US 10,157,471 B2
(45) Date of Patent: Dec. 18, 2018

(54) AREA ALIGNMENT TOOL

(71) Applicant: Adobe Systems Incorporated, San Jose, CA (US)

(72) Inventor: Fabin Rasheed, Alleppey (IN)

(73) Assignee: Adobe Systems Incorporated, San Jose, CA (US)

(*) Notice: Subject to any disclaimer, the term of this patent is extended or adjusted under 35 U.S.C. 154(b) by 15 days.

(21) Appl. No.: 15/465,077

(22) Filed: Mar. 21, 2017

(65) Prior Publication Data

US 2018/0276831 A1  Sep. 27, 2018

(51) Int. Cl.
*G06T 7/35* (2017.01)
*G06T 7/60* (2017.01)
*G06T 7/514* (2017.01)

(52) U.S. Cl.
CPC .............. *G06T 7/35* (2017.01); *G06T 7/514* (2017.01); *G06T 7/60* (2013.01)

(58) Field of Classification Search
CPC .................................... G06T 7/35; G06T 7/60
USPC .................................................. 345/629–641
See application file for complete search history.

(56) References Cited

U.S. PATENT DOCUMENTS

| | | | | |
|---|---|---|---|---|
| 2005/0068290 A1* | 3/2005 | Jaeger | ............... | G06F 3/04845 345/156 |
| 2007/0253693 A1* | 11/2007 | Hsu | ............. | H04N 5/243 396/213 |
| 2008/0133632 A1* | 6/2008 | Kim | ............ | G06F 19/24 708/404 |
| 2011/0304730 A1* | 12/2011 | Chen | ........... | G01S 3/7864 348/143 |
| 2013/0194297 A1* | 8/2013 | Theophil | ............ | G06F 17/211 345/619 |
| 2014/0131443 A1* | 5/2014 | Smith | .............. | G06K 7/1404 235/454 |
| 2014/0201126 A1* | 7/2014 | Zadeh | ............. | G06K 9/627 706/52 |
| 2014/0267174 A1* | 9/2014 | Lin | ............... | G06F 3/0428 345/175 |

* cited by examiner

*Primary Examiner* — Ryan R Yang
(74) *Attorney, Agent, or Firm* — Brake Hughes Bellermann LLP

(57) ABSTRACT

A computer-implemented method for visually aligning an object includes calculating a weighted distribution of a brightness of an object, determining a center point of the object using the weighted distribution of the brightness of the object and automatically aligning the object using the center point of the object.

17 Claims, 7 Drawing Sheets

AREA ALIGNMENT TOOL

TECHNICAL FIELD

This description relates to an area alignment tool.

BACKGROUND

Graphic components may be aligned in different types of geometric alignments such as center alignment, right alignment, left alignment, top alignment and bottom alignment. For certain graphic components such as, for example, asymmetric geographic components, the geometric alignment may not coincide with a visual alignment of the component, where the visual alignment may be more visually pleasing to the eye than the geometric alignment. Similarly to geometric components, text may be aligned in similar geometric alignments that differ from the visual alignment of the text. Currently, users such as graphic designers may visually align graphic components and text by geometrically aligning the object and then using their eyes to find a visual center of the object. Then, the user manually manipulates the object to visually align the object.

SUMMARY

According to one general aspect, visually aligning an object along a center alignment includes calculating a weighted distribution of a brightness of an object and determining a center point of the object using the weighted distribution of the brightness of the object. The object is automatically aligned using the center point of the object. Multiple objects may be aligned with respect to each other. An optional visual indicator may mark the center point of the object.

In another general aspect, visually aligning an object along a left, right, top or bottom alignment includes calculating a weighted distribution of a brightness of an object and determining a deviation point of the object when a deviation of the weighted distribution of the brightness of the object crosses a threshold value. The object is automatically aligned using the deviation point of the object. Multiple objects may be aligned with respect to each other. An optional visual indicator may mark the alignment point.

The details of one or more implementations are set forth in the accompanying drawings and the description below. Other features will be apparent from the description and drawings, and from the claims.

DETAILED DESCRIPTION

Figure 1:
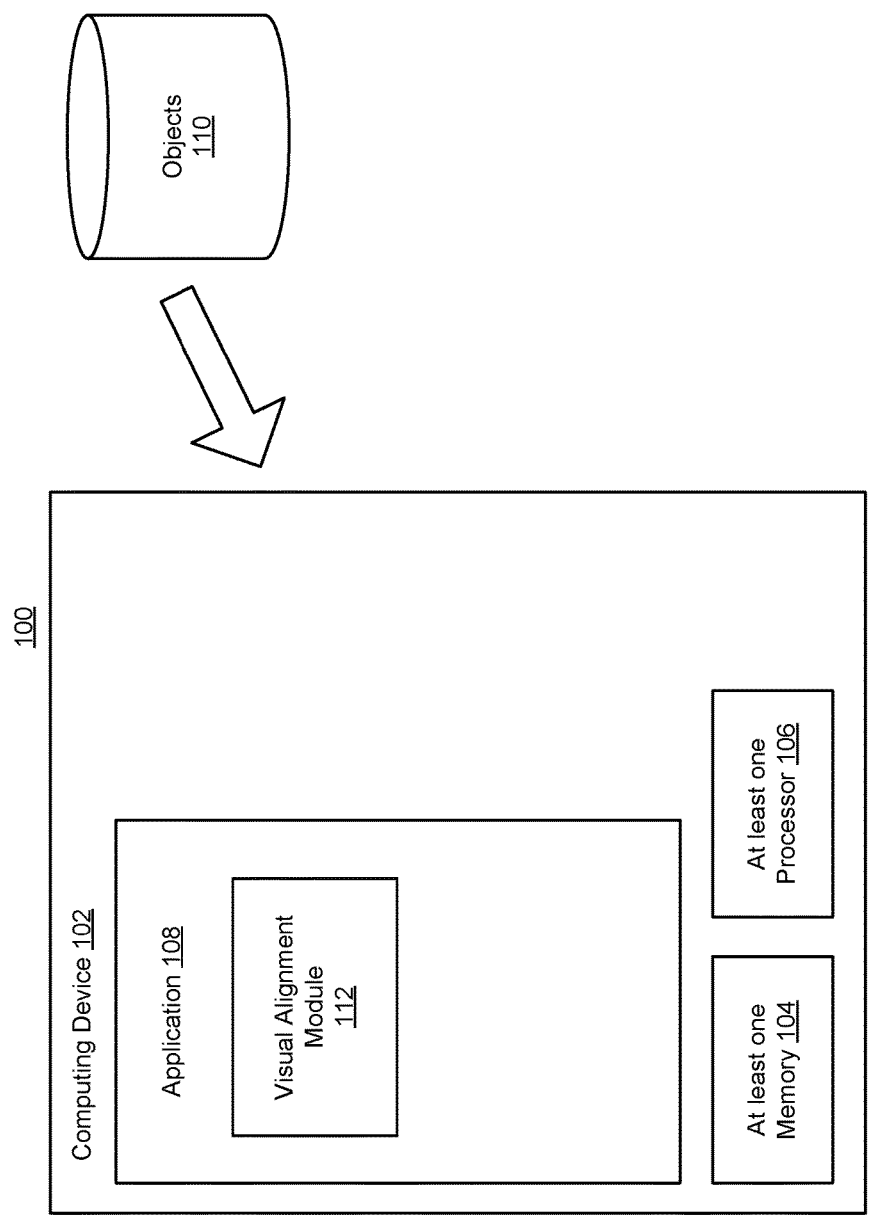
FIG. 1 is a block diagram of a system for visually aligning objects.

This document describes systems and techniques to visually align objects in an automated manner, meaning that a user does not have to manipulate the object manually in order to visually align the object. Such systems and techniques enable the user to select an object and to visually align the object in different types of alignments such as center, top, bottom, right, or left. The systems and techniques also enable the user to visually align the object in these different types of alignments to another object or objects such that the multiple objects are in visual alignment with each other.

Visual alignment differs from geometric alignment. In geometric alignment, if an image needs to be geometrically aligned a bounding box may be used, where the bounding box encompasses the object to be aligned. For a center alignment, the midpoint between the left and right edges of the bounding box of the object is considered as the center of the object. The midpoint is then used for aligning the object to other objects.

A technical challenge is presented when it comes to aligning asymmetric objects, including shapes and text, because geometric alignment does not provide the visual center of the asymmetric object. That is, for visual alignment, the visual center may not be exactly at the midpoint but may be at a different point based on the shape of the object. The system and techniques described herein provide an automated process to determine a visual center of the object based on the type of alignment being performed. The system and techniques align the object using the determined visual center. The automated process achieves faster and more accurate visual alignment of objects than a user simply visually weighing a shape and finding its visual center using their intuition and manual manipulation of the objects. The visual alignment process enables easy selection and alignment of multiple different asymmetric-shaped and symmetric-shaped objects. There are different types of visual alignment including top, bottom, right, left and center visual alignment. One technique may be used to determine a center alignment and a slightly differing technique may be used to determine a top, bottom, right, and left alignment.

The system and techniques may be applied to various different types of objects. Objects may be defined to include images and text. Images may include different types of shapes of different sizes, colors and shading. Images may include, but are not limited to, icons, interface elements, logos and many other types of images. Text includes individual characters, strings of characters and lines of characters.

Another technical challenge faced is when the same leading values are applied to a paragraph that could result in a larger gaps between some lines of text as compared to tighter gaps between other lines of text. Leading refers to the vertical distance between lines of text that is commonly measured from the baseline of each line of text. The system and techniques solve the visual disparity due to the gap differences between the lines of text to make the text more visually pleasing using this automated process.

The system and techniques discussed herein solve these technical challenges and other technical challenges by determining a brightness of an object and generating a weighted distribution of the brightness of the object. For a center alignment, a center point of the object is determined using the weighted distribution of the brightness of the object. Then, the center point of the object may be used as an alignment point to align the object with the center point of other objects. For adjusting the leading of text lines, this same technique may be applied to finding the visual center of each line of text. Then, lines of text are arranged so that the gaps between the lines of text are at equal distances from the visual horizontal center as measured from each line of text.

For other types of alignment such as left, right, bottom and top, the system and techniques determine a weighted distribution of a brightness of an object. A deviation point of the object is determined at a point where a deviation of the weighted distribution of the brightness of the object crosses a threshold value. The deviation point is then used to align the object. The deviation point varies depending on the particular type of alignment being performed. Details of the systems and techniques are discussed below with respect to the illustrated figures.

FIG. 1 is a block diagram of a system 100 for visually aligning objects. The system 100 includes a computing device 102 having at least one memory 104, at least one processor 106 and at least one application 108. The computing device 102 may communicate with one or more other computing devices (not shown) over a network (not shown). The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform its various functions over a network.

The at least one processor 106 may represent two or more processors on the computing device 102 executing in parallel and utilizing corresponding instructions stored using the at least one memory 104. The at least one memory 104 represents a non-transitory computer-readable storage medium. Of course, similarly, the at least one memory 104 may represent one or more different types of memory utilized by the computing device 102. In addition to storing instructions, which allow the at least one processor 106 to implement the application 108 and its various components, the at least one memory 104 may be used to store data, such as one or more of the objects generated by the application 108 and its components.

The application 108 may be accessed directly by a user of the computing device 102. In other implementations, the application 108 may be running on the computing device 102 as a component of a cloud network where a user accesses the application 108 from another computing device over a network. In one implementation, the application 108 may be a graphic design application. The graphic design application may be a standalone application that runs on the computing device 102. Alternatively, the graphic design application may be an application that runs in another application such as a browser application. The graphic design application may enable a user to create and design many different kinds of graphics and layouts. The graphic design application enables the user to define and create different types of objects 110. As illustrated in FIG. 1, the objects created as part of the application 108 may be stored in an objects database 110 which may or may not be part of the computing device 102. The objects created as part of the application 108 may be stored on the computing device 102 or may be stored in a location other than computing device 102 and accessed over a network by the computing device 102.

As discussed above, the objects 110 include images and text. The application 108 may include many different components or modules needed to support such a graphic design application. One of the modules or components implemented as part of the application 108 includes a visual alignment module 112. The visual alignment module 112 enables the visual alignment of objects in an automated manner. For example, for a single object, the visual alignment module 112 enables an automated visual alignment of the object for different types of alignments. The visual alignment module 112 enables center visual alignment, a top visual alignment, a bottom visual alignment, a right visual alignment and a left visual alignment. For the single object, an optional indicator, such as a line or a point or other visual marker, may be added to the object to indicate and mark the desired alignment location. This will be discussed in more detail below with respect to FIG. 2.

For multiple objects, the visual alignment module 112 enables an automated visual alignment of the objects with respect to each other for the different types of alignments. For instance, the visual alignment module 112 may align two objects in a center alignment. The application 108 may enable the user to select two objects and indicate they are to be visually align along a center alignment and the visual alignment module 112 will automatically visually align both objects with respect to each other. When aligning the two objects, the visual alignment module finds the center alignment point for each of the objects and then aligns the objects along those center alignment points with respect to each other. While the example above is discussed in terms of two objects, the visual alignment module 112 is not limited to aligning only two objects and may be used to align more than two objects.

Figure 2:
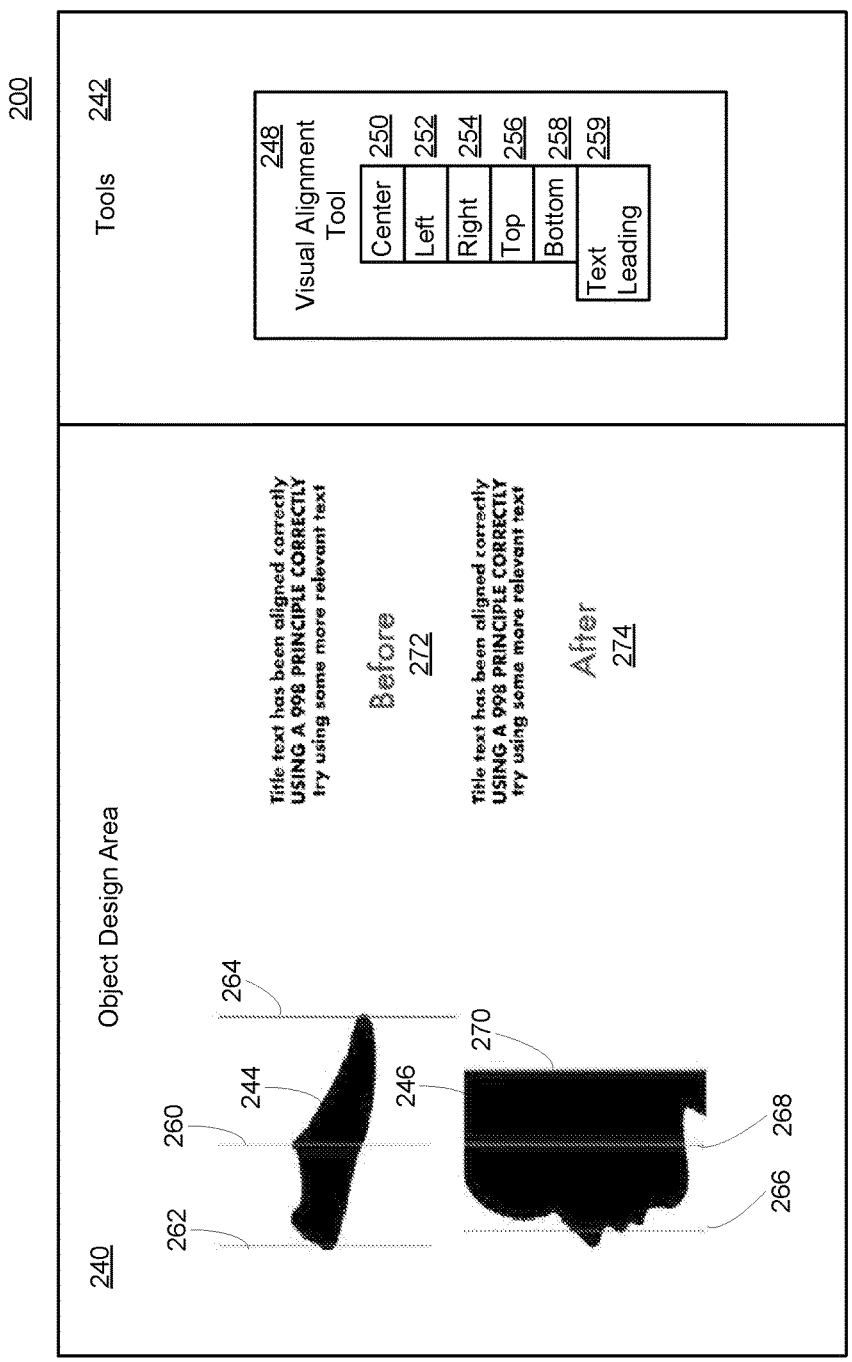
FIG. 2 is an example screen shot illustrating an example user interface for a graphic design application.

Referring also to FIG. 2, an example user interface 200 for the application 108 is illustrated. The user interface 200 may be one example user interface for a graphic design application. The user interface 200 may include many more features and functionalities than what is illustrated here. The user interface 200 is meant to illustrate the functionality of the visual alignment module 112 as part of a graphic design application.

The user interface 200 includes an object design area 240 and a tools area 242. The object design area 240 is a part of the user interface where the user can create and manipulate objects. For example, shown on the left side is an object of a shoe 244 and an object of a face profile 246. These objects may have been created as part of the application 108 using the user interface 200 or may have been loaded into the user interface 200 from an objects repository, such as objects database 110 of FIG. 1.

The tools area 242 includes multiple different tools for use by the user to create and/or manipulate the objects in the object design area 240, such as the shoe 244 and the face profile 246. One tool that is illustrated in the tools area 242 is the visual alignment tool 248. Use of the visual alignment tool 248 invokes the functionality of the visual alignment module 112 of FIG. 1. When selected, the visual alignment tool 248 enables visual alignment for various types of alignments of one or more objects.

For example, the visual alignment tool 248 is configured to enable a center alignment 250, a left alignment 252, a right alignment 254, a top alignment 256 and a bottom alignment 258. This menu of alignments 250-258 may be presented to the user in various ways including as a drop-down menu for selection by the user. Other interface options include by right mouse click and selection from a menu and other various presentation and selection formats.

In one implementation, for alignment of a single object, the user may select an object such as object 244 and then select the visual alignment tool 248 and designate a desired type of alignment. When the desired type of alignment is selected, the visual alignment tool 248, invoking the functionality of the visual alignment module 112, automatically finds the visual alignment for the selected type of alignment. For example, if the user selects a center alignment 250, the visual alignment module 112 automatically finds the center point of the object 244. On the other hand, if the user selects a left alignment 252, the visual alignment module 112 automatically finds the left alignment point of the object 244. The same process occurs for the other types of alignments.

One optional feature includes providing an indicator on the object to visually show the user the selected alignment point. For example, for the center alignment of the object 244, the visual alignment tool 248, through the functionality of the visual alignment module 112, may automatically find the center point of the object 244 and mark the center point with an indicator 260. In this example, the indicator 260 is a line through the center point of the object. Other types of indicators may be used to visually mark the center point of the object 244. By marking the center point with the indicator 260, the user is provided a visual indicator and can manipulate the object 244 in a desired manner using the marked center point of the visual alignment in a desired manner.

In this example, the visual alignment tool 248 also has marked the left alignment with an indicator 262 and the right alignment with an indicator 264. Similarly, with the object 246, the visual alignment tool 248 has marked the left alignment point with an indicator 266, the center alignment point with an indicator 268 and the right alignment point with an indicator 270. In one implementation, the visual alignment tool 248 marks only a single type of alignment with one indicator. The visual alignment tool 248 also may mark more than one alignment type on the object. In these examples, three visual indicator points are marked. While not shown, the visual alignment tool also may mark the top alignment and the bottom alignment for the objects 244 and 246.

Another feature of the visual alignment tool 248 is to select more than one object and to visually align the objects relative to each other along a selected alignment type. For example, the visual alignment tool 248 may be used to visually align the object 244 and the object 246 in an automated manner without a user having to align or manipulate the objects to the alignment with respect to one another. In the example of FIG. 2, a user may select those object 244 and object 246. The type of alignment 250-258 may be selected from the visual alignment tool 248 and the visual alignment module 112 automatically aligns the objects with respect to one another. The visual alignment module 112 may first find the alignment point of each individual object and then align the objects with respect to one another using the alignment points.

As shown in the example of FIG. 2, the objects 244 and 246 have been aligned to one another along their respective center points 260 and 268. In other examples, the visual alignment tool 248 may be used to align the objects 244 and 246 having using other types of alignments such as left alignment, right alignment, top alignment and bottom alignment. For instance, for a left alignment, the visual alignment tool 248 first finds the left alignment point for each object 262 and 266 and then aligns the objects along the left alignment points 262 and 266 with respect to one another. As noted above, the actual left alignment points 262 and 266 may or may not be made visible to the user but may be determined and then used for the automated alignment.

The visual alignment tool 248 also may be used to visually align objects that are text such as the text 272. In the example, the text 272 illustrates the text before alignment is performed and the text 274 illustrates the text after alignment is performed. The visual alignment tool 248, through the visual alignment module 112, may be used to provide better leading in paragraphs. The user may select the text 272 and use the visual alignment tool 248 to select text leading 259 as the type of alignment to perform. The visual alignment tool 248 determines the horizontal center of each text line and then arranges the horizontal centers of each text line at equal distances from each horizontal center.

More specifically, the visual alignment tool 248 finds the horizontal center for the first line of text, the second line of text and the third line of text. The second line of text is spaced from the first line of text using a distance between the horizontal center for the first line of text and the horizontal center for the second line of text. Then, the third line of text is spaced from the second line of text using the same distance. Thus, the distance from the horizontal center for the second line of text to the horizontal center for the third line of text is the same distance as the horizontal center for the first line of text to the horizontal center for the second line of text. The result is the text 274, which is more visually aligned and more pleasing to the eye than the before text 272.

The visual alignment module 112 uses slightly different approaches for determining a center alignment and the other types of alignments. First, the process for determining a center alignment is discussed, including the process for obtaining better leading paragraphs. The center alignment includes a visual horizontal center alignment and a visual vertical center alignment. Then, the process is discussed for determining the other types of alignments.

Figure 3:
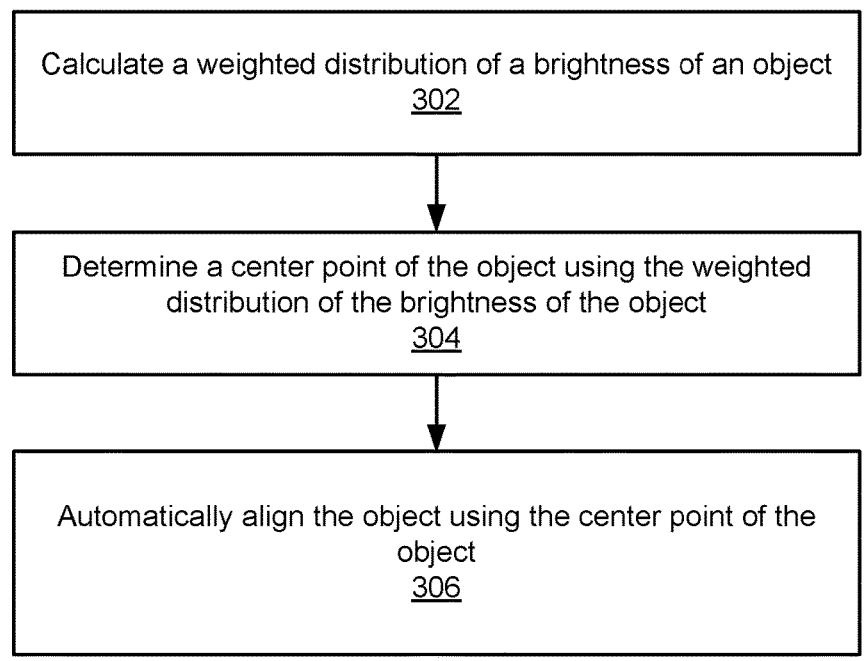
FIG. 3 is an example flowchart illustrating example operations of the system of FIG. 1.

In general for a center alignment, the visual alignment module 112 visually aligns an object along a center alignment by calculating a weighted distribution of a brightness of an object. The visual alignment module 112 does not use a bounding box to determine the visual alignment of the object. Referring also to FIG. 3, the process 300 illustrates a flow chart for visually aligning an object along a center alignment. The visual alignment module 112 may perform and implement the process 300.

Process 300 includes calculating a weighted distribution of a brightness of an object (302). For example, the visual alignment module 112 calculates the weighted distribution of the brightness of an object. More specifically, the visual alignment module 112 may calculate a weighted distribution of the brightness of the object by determining a brightness of each pixel of the object. The brightness of each pixel may be a single value on a particular scale that represents the brightness of the pixel. In one implementation, the range of values may be from 0 to 255, where a value of 0 is defined as a black pixel and a value of 255 is defined as a white pixel. In other implementations, other scales may be used including a range of values from 0 to 100. The type of scale used also may depend on whether or not the object is in greyscale or in color.

The visual alignment module 112 also may determine a brightness of a background of the object. In general, the background of the object may be defined as the pixels surrounding the object and/or in gaps within the object. The size of the background of the object may vary from object to object. The visual alignment module 112 calculates the weighted distribution of the brightness of the object using the brightness of each pixel of the object in relation to the brightness of the background of the object. In one implementation, the background may include any pixel that is adjacent to a pixel of the object. In other implementations where the object is against a uniformly colored area, the background may include the uniformly covered area.

Figure 4:
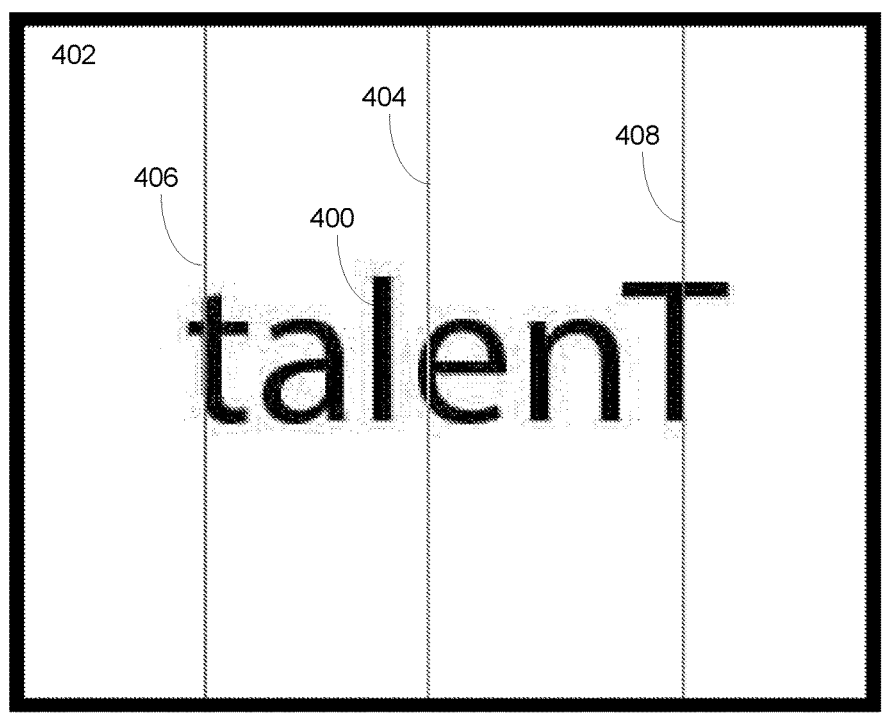
FIG. 4 is an example object that is visually aligned against a background.

Referring to FIG. 4, an example object 400 is illustrated against a uniformly colored background 402. In this example, the object 400 is the text "talent" and the background 402 is the uniformly colored area surrounding the object and in gaps within the object, such as in gaps within the letters "a" and "e". In one implementation, the background may be identified by the use during selection of an area that includes both the object and the background. In other implementations, the visual alignment module 112 identifies and uses the uniformly colored pixels surrounding the object and within gaps of the object as the background. In this example, the visual alignment module 112 calculates the weighted distribution of the brightness of the object 400 using the brightness of each pixel of the object in relation to the brightness of the background 402.

Referring back to FIG. 3, process 300 includes determining a center point of the object using the weighted distribution of the brightness of the object (304). For example, the visual alignment module 112 is configured to determine the center point of the object using the weighted distribution of the brightness of the object. The visual alignment module 112 generates a weighted object from the weighted distribution of the brightness of the object. The visual alignment module 112 determines the center point of the object by determining a midpoint of the weighted object.

Process 300 and the visual alignment module 112 includes being able to determine a horizontal center point of the object or a vertical center point of the object. For leading of text lines in a paragraph, the visual alignment module 112 determines the horizontal center point of each line of text.

In the example of FIG. 4, the visual alignment module 112 determines the center point 404 of the object 400, where the center point 404 is a vertical center point.

Process 300 includes automatically aligning the object using the center point of the object (306). For example, the visual alignment module 112 is configured to automatically align the object using the center point of the object. The automatic alignment of a single object may include providing a visual indicator such as a line or a point or other marker on the center point of the object. The visual indicator then may be used to align the object to other objects as desired.

The automatic alignment of multiple objects includes finding the center point of each object and then automatically aligning the objects along the center points with respect to each other, as illustrated in FIG. 2 with objects 244 and 246.

In the example of FIG. 4, the visual alignment module 112 may automatically align the object 400 in relation to the background 402 such that the center point 404 of the object 400 is visually aligned in the center of the background 402.

For a vertical center alignment, the visual alignment module 112 determines the vertical midpoint of the weighted object and automatically aligns the object using the vertical midpoint of the weighted object. For a horizontal center alignment, the visual alignment module 112 determines the horizontal midpoint of the weighted object and automatically aligns the object using the horizontal midpoint of the weighted object.

Figure 5:
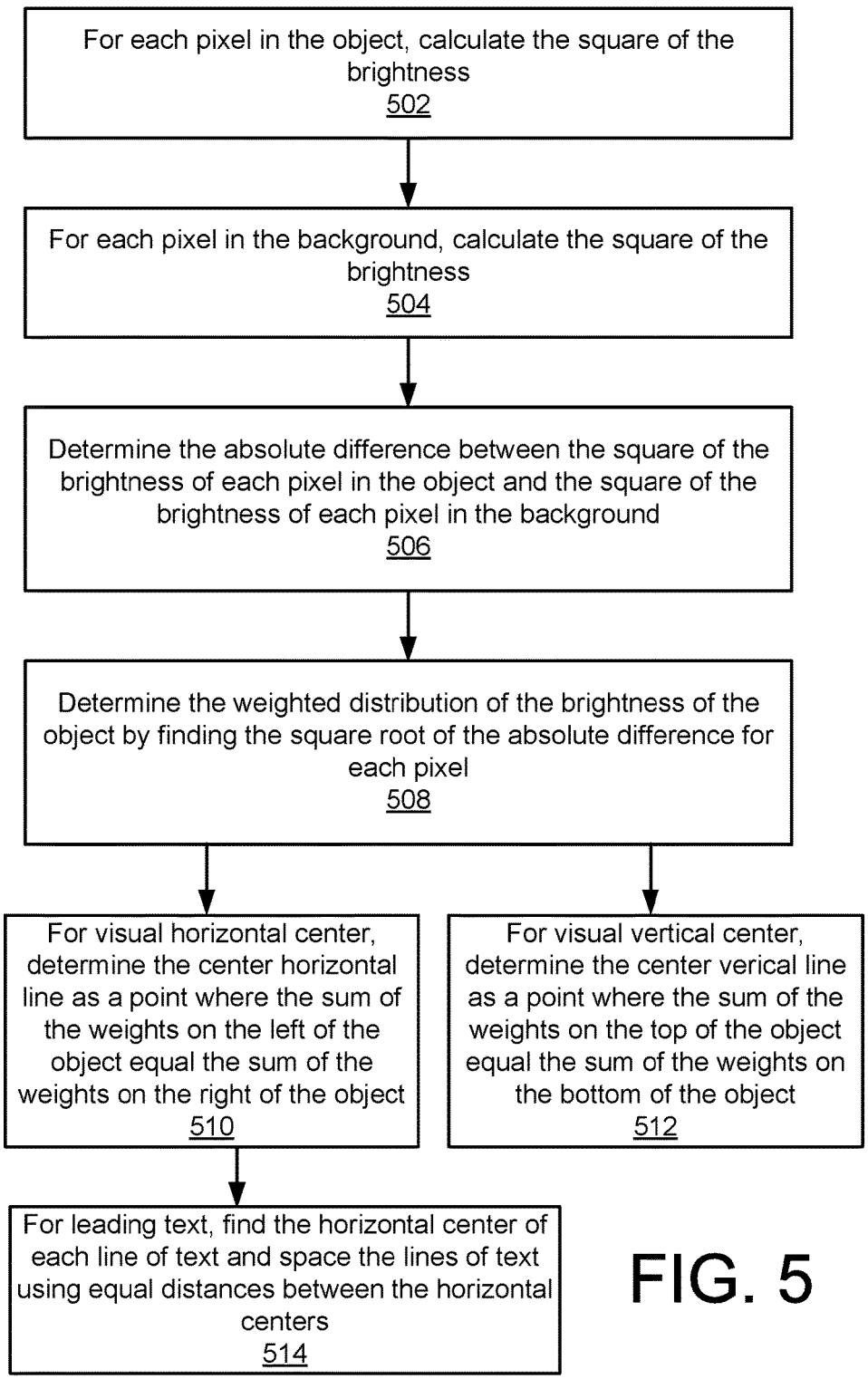
FIG. 5 is an example flowchart illustrating example operations of the system of FIG. 1.

Referring to FIG. 5, the process 500 illustrates a more detailed process regarding how the visual alignment module 112 calculates the weighted distribution of the brightness of the object, finds the center point of the object and aligns the object using the center point. For instance, to calculate the weighted distribution of the brightness of the object (302), process 500 includes calculating the square of the brightness for each pixel in the object (502) and calculating the square of the brightness for each pixel in the background (504). Then, process 500 determines the absolute difference between the square of the brightness of each pixel in the object and the square of the brightness of each pixel in the background (506). Next, process 500 determines the weighted distribution of the brightness of the object by finding the square root of the absolute difference for each pixel (508).

After finding the weighted distribution of the brightness of the object, the visual alignment module 112 finds the center point of the object (304). For the visual horizontal center, the visual alignment module 112 determines the center horizontal line as a point where the sum of the weights on the left of the object equal the sum of the weights on the right of the object (510). For the visual vertical center, the visual alignment module 112 determines the center vertical line as a point where the sum of the weights on the top of the object equal the sum of the weights on the bottom of the object. (512).

As discussed above, the visual alignment module 112 can visually space lines of text such as the leading of text in a paragraph. For lines of text, the visual alignment module 112 finds the horizontal center of each line of text, as discussed above, and spaces the lines of text using equal distances between the horizontal center lines (514).

Figure 6:
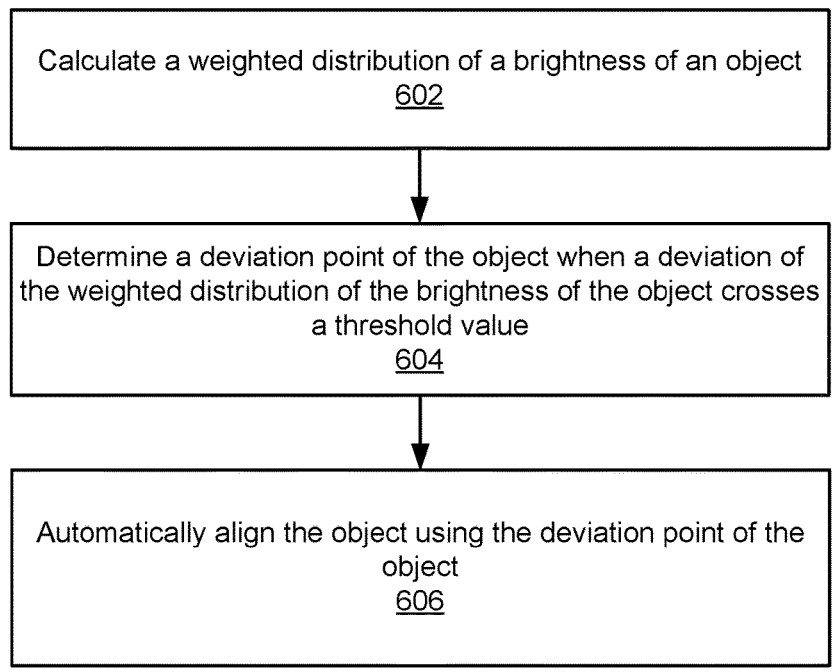
FIG. 6 is an example flowchart illustrating example operations of the system of FIG. 1.

Referring to FIG. 6, the process 600 illustrates a flow chart for the visual alignment module 112 to determine left, right, bottom and top alignments. Process 600 includes calculating a weighted distribution of a brightness of an object (602). For example, the visual alignment module 112 is configured to calculate the weighted distribution of the brightness of the object. The visual alignment module 112 may scan the object pixel by pixel until the entire object is covered. For a left alignment, the scan is performed from left to right. For a right alignment, the scan is performed from right to left. For a top alignment, the scan is performed from top to bottom. For a bottom alignment, the scan is performed from bottom to top.

Process 600 includes determining a deviation point of the object when a deviation of the weighted distribution of the brightness of the object crosses a threshold value (604). For example, the visual alignment module 112 determines the deviation point of the object when the deviation of the weighted distribution of the brightness of the object crosses a threshold value. Process 700 of FIG. 7 below describes in more detail how the visual alignment module 112 determines the deviation point. The threshold value may be a value that is set by the user and is user configurable.

Process 600 includes automatically aligning the object using the deviation point of the object (606). For example, the visual alignment module 112 automatically aligns the object using the deviation point of the object. In the example of FIG. 4, the visual alignment module 112 may align the object 400 for a left visual alignment and mark the left alignment using an optional indicator 406. Similarly, the visual alignment module 112 may align the object 400 for a right visual alignment and mark the right alignment using an optional indicator 408. In other examples, the visual alignment module 112 may automatically align multiple objects using process 600 for a right, left, top or bottom alignment.

Figure 7:
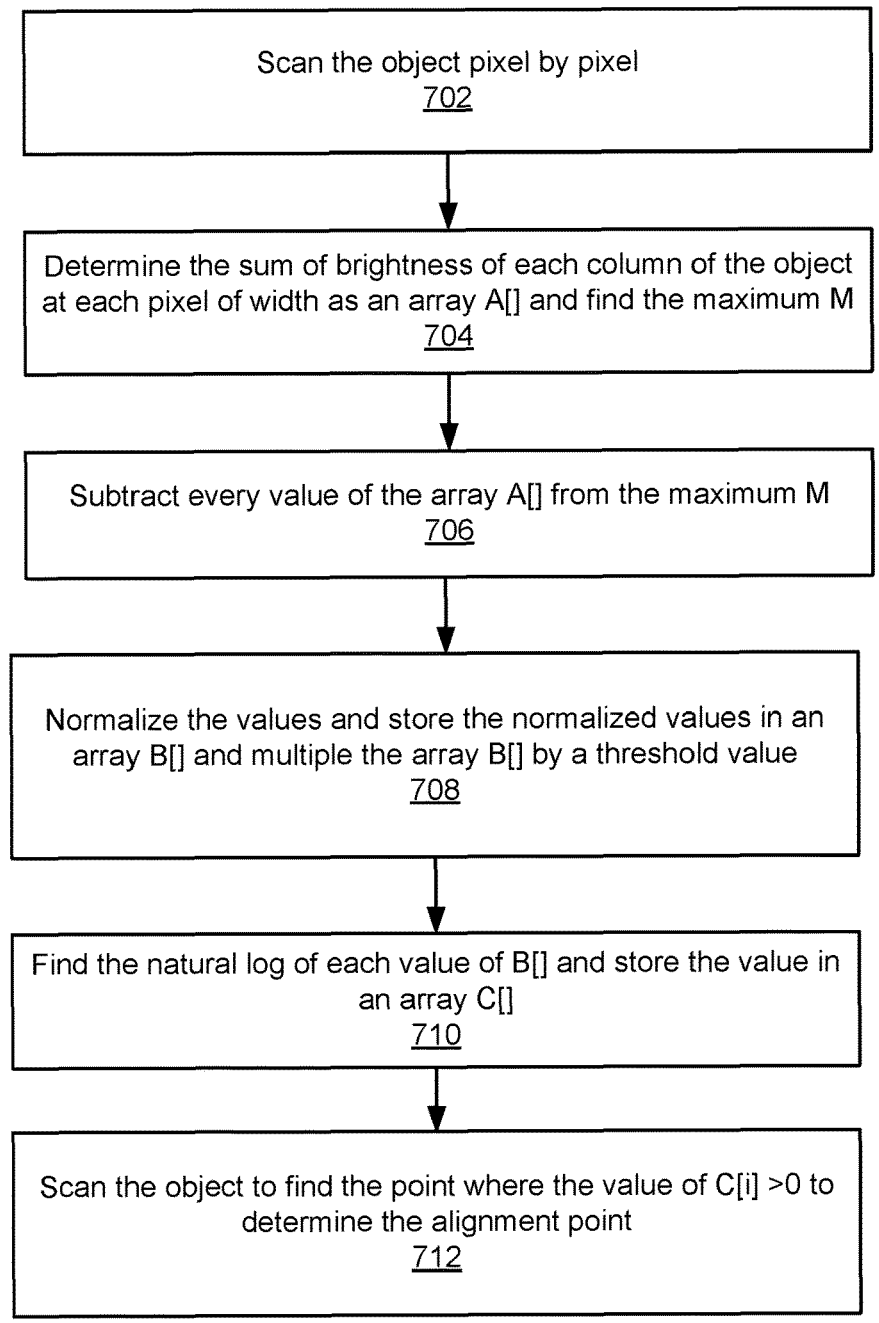
FIG. 7 is an example flowchart illustrating example operations of the system of FIG. 1.

Referring to FIG. 7, process 700 illustrates a more detailed flow chart for how the visual alignment module 112 performs a right, left, top or bottom alignment. Process 700 includes scanning the object pixel by pixel (702). For a left alignment, the object is scanned from left to right. For a right alignment, the object is scanned from right to left. For a top alignment, the object is scanned from top to bottom. For a bottom alignment, the object is scanned from bottom to top.

Process 700 includes determining the sum of the brightness of each column of the object at each pixel of width as an array A[] and finding the maximum value M (704). For example, for an object having five columns of pixels, the sum of the brightness of every column of pixels is stored as an array −A[100, 75, 50, 25, 0], with the maximum value, M, being the column with the highest value. In this example, M is 100.

Then, every value of the array A[] is subtracted from the maximum M (706). In the example from above, every value of the array A[100, 75, 50, 25, 0] is subtracted from the M−100, which results in the array A[0, 25, 50, 75, 100].

The values are normalized and the normalized values are stored in an array B[] and the array B[] is multiplied by threshold value (708). For the example above, the values from the array are normalized and stored in an array B[0, 0.25, 0.5, 0.75, 1]. Then, the normalized values are multiplied by a threshold value, which for instance may be 2. The result is an array B[0, 0.5, 1, 1.5, 2].

The natural log of each value of the array B[] is found and that value is stored in an array C[] (710). For the example above, the natural log of each value of the array B[] results in C[infinity, −0.69, 0, 0.22, 0.69].

Then, to find the alignment point, the object is scanned to find the point where the value of C[i]>0 (712). In this example, the alignment point is the fourth column in the array, which is the point where the array is greater than 0.

In this manner, the visual alignment module 112 can automatically align the objects in a left, right, top or bottom alignment. As discussed above and illustrated in FIG. 2, the alignment may include providing an optional visual indicator of the alignment point. For multiple objects, the alignment point is found for each object and then the objects are automatically aligned along the alignment points with respect to each other.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer-implemented method for visually aligning an object including executing instructions stored on a non-transitory computer-readable storage medium, the method comprising:

determining a brightness of each pixel of an object;
determining a brightness of a background of the object;
calculating a weighted distribution of a brightness of the object using the brightness of each pixel of the object in relation to the brightness of the background of the object;
determining a center point of the object using the weighted distribution of the brightness of the object; and
automatically aligning the object using the center point of the object.

2. The method as in claim 1, further comprising:
generating a weighted object from the weighted distribution of the brightness of the object, and
wherein determining the center point of the object comprises determining a midpoint of the weighted object.

3. The method as in claim 2, wherein:
determining the midpoint of the weighted object comprises determining a vertical midpoint of the weighted object; and
automatically aligning the object comprises automatically vertically aligning the object using the vertical midpoint of the weighted object.

4. The method as in claim 2, wherein:
determining the midpoint of the weighted object comprises determining a horizontal midpoint of the weighted object; and
automatically aligning the object comprises automatically horizontally aligning the object using the horizontal midpoint of the weighted object.

5. The method as in claim 1, wherein the object comprises an asymmetric object.

6. The method as in claim 1, further comprising marking the center point of the object with a visual indicator.

7. The method as in claim 1, wherein automatically aligning the object includes automatically aligning the object to another object.

8. The method as in claim 1, wherein:
the object includes multiple lines of text;
determining the center point of the object includes determining a horizontal center point for each line of text; and
automatically aligning the object includes spacing each line of text equidistant from an adjacent line of text from the horizontal center point for each line of text.

9. A computer program product for visually aligning an object the computer program product being tangibly embodied on a non-transitory computer-readable storage medium and comprising instructions that, when executed by at least one computing device, are configured to cause the at least one computing device to:
calculate a weighted distribution of a brightness of an object by:
scanning the object pixel by pixel and determining a sum of the brightness of each column of the object at each pixel of width,
subtracting every value of the sum of the brightness from a maximum value,
normalizing the values, and
multiplying the values by a threshold value;
determine a deviation point of the object when a deviation of the weighted distribution of the brightness of the object crosses a threshold value; and
automatically align the object using the deviation point of the object.

10. The computer program product of claim 9, wherein the instructions that, when executed by the at least one computing device, are configured to cause the at least one computing device to automatically align the object include instructions that, when executed by the at least one computing device, are configured to cause the at least one computing device to:
automatically left align the object in relation to another object.

11. The computer program product of claim 9, wherein the instructions that, when executed by the at least one computing device, are configured to cause the at least one computing device to automatically align the object include instructions that, when executed by the at least one computing device, are configured to cause the at least one computing device to:
automatically right align the object in relation to another object.

12. The computer program product of claim 9, wherein the instructions that, when executed by the at least one computing device, are configured to cause the at least one computing device to automatically align the object include instructions that, when executed by the at least one computing device, are configured to cause the at least one computing device to:
automatically top align the object in relation to another object.

13. The computer program product of claim 9, wherein the instructions that, when executed by the at least one computing device, are configured to cause the at least one computing device to automatically align the object include instructions that, when executed by the at least one computing device, are configured to cause the at least one computing device to:
automatically bottom align the object in relation to another object.

14. The computer program product of claim 9, wherein the object comprises an asymmetric object.

15. The computer program product of claim 9, wherein the object comprises text.

16. The computer program product of claim 9, further comprising instructions that, when executed by the at least one computing device, are configured to cause the at least one computing device to:
mark the object with a visual indicator at the deviation point of the object.

17. A system for visually aligning at least two objects, the system comprising:
at least one memory including instructions; and
at least one processor that is operably coupled to the at least one memory and that is arranged and configured to execute instructions that, when executed, cause the at least one processor to implement a visual alignment module that is configured to:
determine a brightness of each pixel of at least two objects;
determine a brightness of a background of the at least two objects;
calculate a weighted distribution of a brightness for each of the at least two objects using the brightness of each pixel of the at least two objects in relation to the brightness of the background of the at least two objects;
determine a center point for each of the at least two objects using the weighted distribution of the brightness for each of the at least two objects; and
automatically align the at least two objects to each other using the center points of each of the at least two objects.

* * * * *